United States Patent [19]
Takahashi

[11] Patent Number: 4,676,606
[45] Date of Patent: Jun. 30, 1987

[54] IMAGE TRANSMISSION OPTICAL SYSTEM FOR AN ENDOSCOPE

[75] Inventor: Susumu Takahashi, Tokyo, Japan

[73] Assignee: Olympus Optical Co., Ltd., Tokyo, Japan

[21] Appl. No.: 780,607

[22] Filed: Sep. 26, 1985

[30] Foreign Application Priority Data

Oct. 2, 1984 [JP] Japan .................. 59-206725

[51] Int. Cl.⁴ ............................................. G02B 9/64
[52] U.S. Cl. ................................. 350/463; 350/573
[58] Field of Search .................... 350/463, 469, 573

[56] References Cited

U.S. PATENT DOCUMENTS 3,257,902 6/1966 Hopkins .
4,168,882 9/1979 Hopkins ............................ 350/471
4,575,195 3/1986 Hoogland ........................... 350/573

FOREIGN PATENT DOCUMENTS 49-5993 2/1974 Japan .
52-4245 1/1977 Japan .

Primary Examiner—John K. Corbin
Assistant Examiner—Rebecca D. Gass
Attorney, Agent, or Firm—Cushman, Darby & Cushman

[57] ABSTRACT

An image transmission optical system for an endoscope comprising a first lens component which comprises a positive lens, a second lens component which comprises two meniscus lenses arranged that the concave surfaces thereof face each other, a third lens component having positive refractive power, a fourth lens component which comprises two meniscus lenses arranged that the concave surfaces thereof face each other, and a fifth lens component which comprises a positive lens, the image transmission optical system being arranged to be symmetrical in respect to the center of the third lens component and arranged that curvature of field is corrected favorably.

10 Claims, 19 Drawing Figures

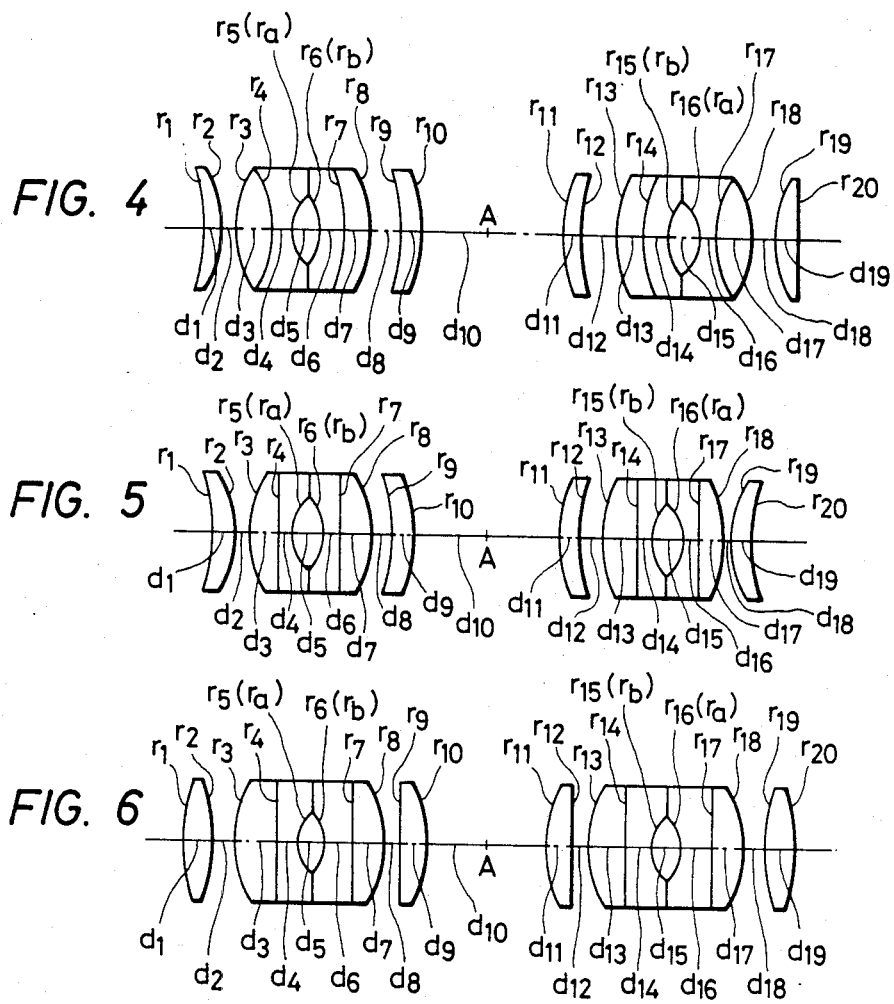

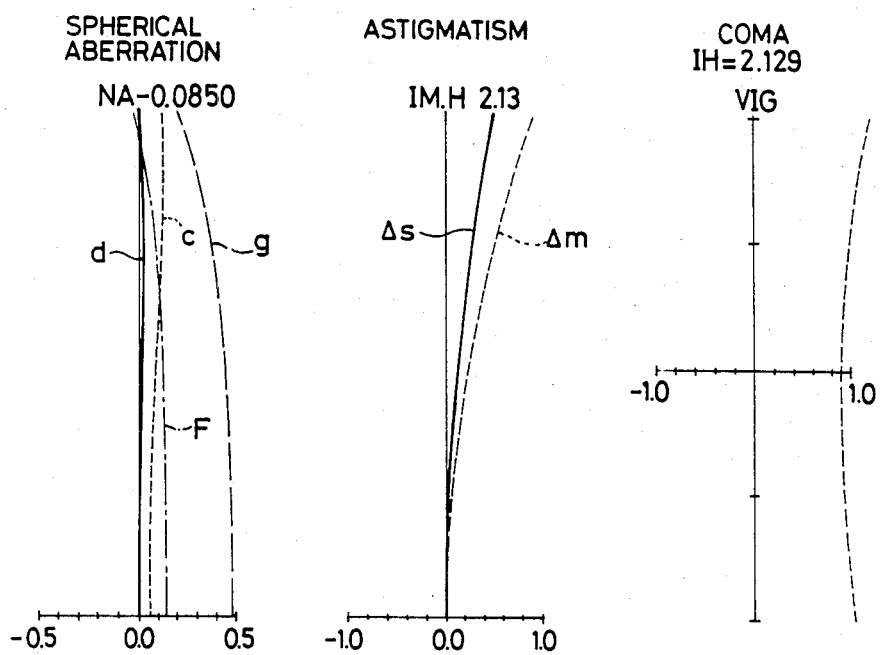
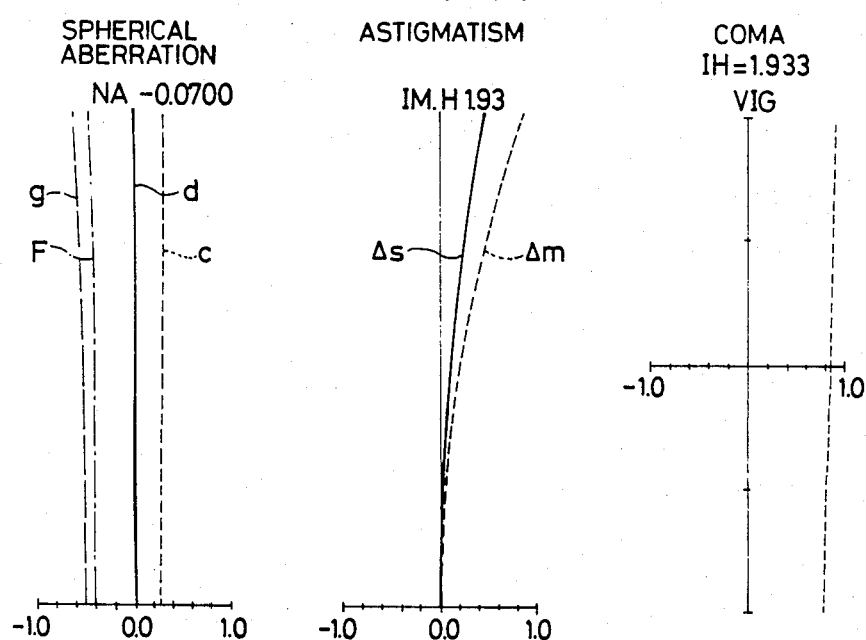

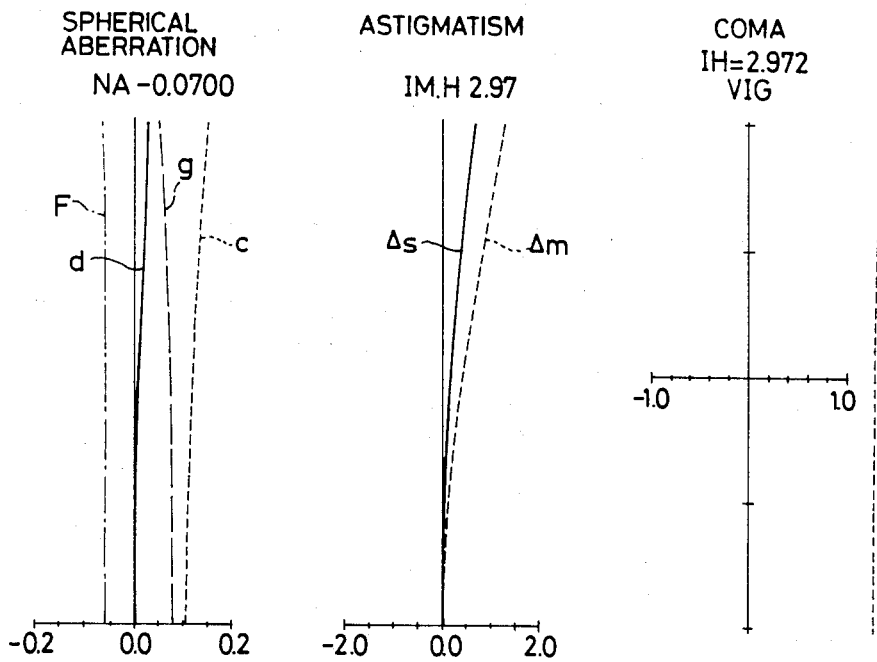
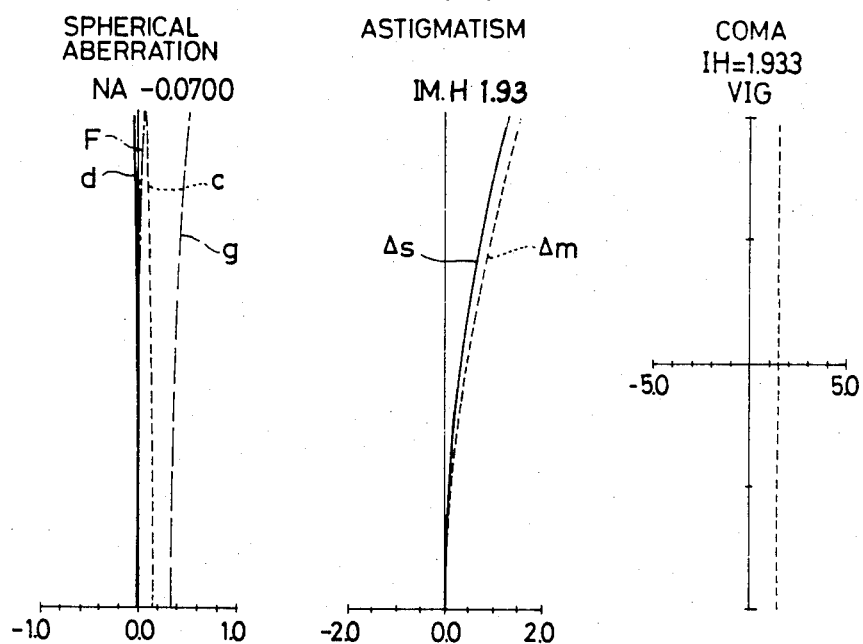

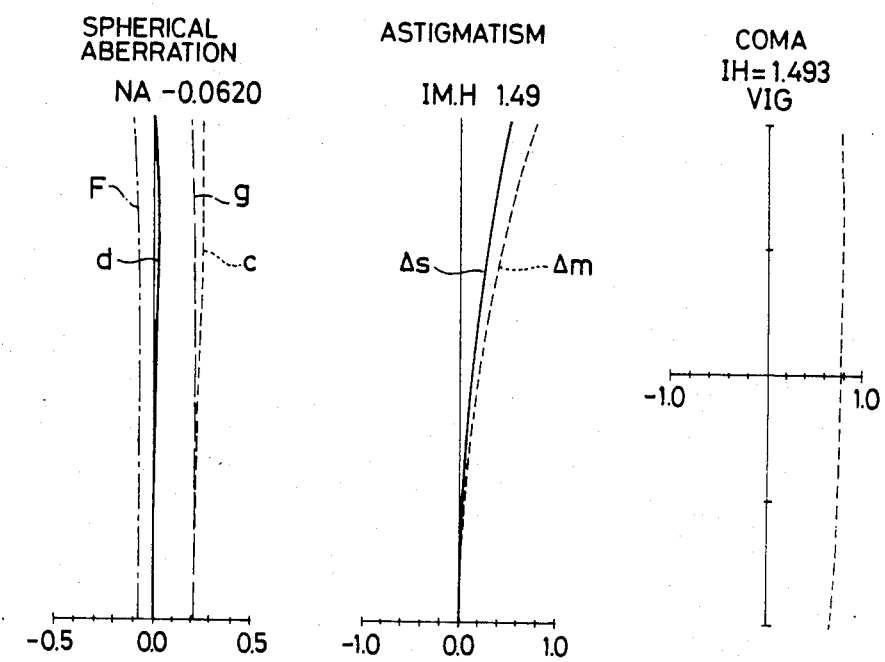

IMAGE TRANSMISSION OPTICAL SYSTEM FOR AN ENDOSCOPE

BACKGROUND OF THE INVENTION (a) Field of the Invention

The present invention relates to an image transmission optical system for an endoscope and, more particularly, to an image transmission optical system to be used with an inflexible-type endoscope or the like which is arranged to transmit an image by using a plural number of relay lenses.

(b) Description of the Prior Art

An inflexible-type endoscope arranged to transmit an image by using a plural number of relay lenses is composed that an objective 2, image transmission optical systems 3, 3', ... and eyepiece 4 are arranged in an outer tube 1 in the order from the object side as shown in FIG. 17. The above-mentioned type of endoscope is arranged that an image Q of an object formed by the objective 2 is relayed in turn as $Q_1$, $Q_2$, ... by means of respective image transmission optical systems 3, 3', ... , and the last image $Q_L$ is observed through the eyepiece 4. The image transmission optical system disclosed in Japanese publised examined patent application No. 5993/74 is known as an image transmission optical system to be used with the above-mentioned type of endoscope. Said known image transmission optical system is arranged that two rod-like cemented doublets, each consisting of a positive lens element and negative lens element cemented together, are arranged so that the negative lens elements thereof face each other as shown in FIG. 18.

In case of said known image transmission optical system, spherical aberration, coma and chromatic aberration are corrected favourably. However, curvature of field is not corrected satisfactorily and, moreover, astigmatic difference is caused. Therefore, when the number of image transmission optical systems constituting the endoscope becomes large, curvature of field and astigmatic difference are accumulated and become very large. As a result, it is impossible to bring both of the central portion and marginal portion of the image into focus at the same time.

The image transmission optical system disclosed in Japanese published unexamined patent application No. 4245/77 is known as an image transmission optical system arranged to eliminate the above-mentioned disadvantage. Said known image transmission optical system is composed that two rod-like meniscus lenses 7 and 8, which are arranged so that the concave surfaces thereof face each other, are arranged between two rod-like biconvex lenses 5 and 6 as shown in FIG. 19 and is arranged that curvature of field and astigmatic difference are corrected by means of negative action of an air lens 9 which is formed by those two concave surfaces.

However, also in case of said known image transmission optical system, the image surface somewhat inclines toward the negative side. Therefore, when the number of image transmission optical systems to be used for transmission of image is large, curvature of field is accumulated and, as a result, flatness of image becomes unfavourable.

SUMMARY OF THE INVENTION

It is, therefore, a primary object of the present invention to provide an image transmission optical system for an endoscope of which curvature of field is corrected more favourably.

The image transmission optical system according to the present invention comprises, as shown in FIG. 1, a first lens component 10 comprising a positive lens, a second lens component 13 comprising two meniscus lenses 11 and 12 which are arranged that the concave surfaces thereof face each other, a third lens component 14 comprising a positive lens, a fourth lens component 17 comprising two meniscus lenses 15 and 16 which are arranged that the concave surfaces thereof face each other, and a fifth lens component 18 comprising a positive lens, said image transmission optical system according to the present invention being arranged to be symmetrical in respect to the center A of the third lens component 14.

The image transmission optical system according to the present invention arranged as described in the above has stronger action to correct curvature of field compared with known image transmission optical systems because biconvex air lenses 19 and 20 respectively having negative actions are formed by the second lens component 13 and the fourth lens component 17.

As the image transmission optical system according to the present invention has extremely strong action to correct curvature of field as described in the above, it is possible to incline the image surface toward the positive side. Therefore, when an inflexible-type endoscope is arranged that, as shown in FIG. 2, only one of a plural number of image transmission optical systems constituting the endoscope is formed by adopting the image transmission optical system according to the present invention and the other ones are formed by adopting, for example, a known simple lens system 3 disclosed in Japanese published examined patent application No. 5993/74 or by adopting a long rod-like relay lens consisting of a gradient-index lens such as SELFOC (brand name) or the like, it is possible to arrange that the negative curvature of field caused by said known lens systems 3, 3', ... or by said long rod-like relay lenses is offset by the positive curvature of field caused by the image transmission optical system according to the present invention and to thereby correct so that the image surface of the endoscope as a whole becomes flat.

To arrange that the positive curvature of field is caused as described in the above, the image transmission optical system according to the present invention should be arranged to fulfill the following condition:

$$\phi < 0$$

where, reference symbol $\phi$ represents the sum of refractive powers of surfaces located on one side of the point A. However, in the case of surfaces located on one side of the point A including one or more cemented surfaces cemented by lens element to lens element, $\phi$ does not include the refracted powers of such cemented surfaces since there is no air space through which the light can travel.

If $\phi$ becomes a positive value, the correcting action for curvature of field becomes weak, and it becomes difficult to incline the image surface toward the positive side.

When the first lens component is located at a position close to the image to be transmitted and, at the same time, the thickness of the first lens component is not so large as in cases of embodiments of the present invention to be shown later, it is considered that the first lens component and the meniscus lens arranged on the entrance side in the second lens component function as a field lens, and the meniscus lens arranged on the exit side in the second lens component and the lens portion on the left side (entrance side) of the center A of the third lens component function as an imaging lens. Therefore, the total focal length of the lenses which function as the field lens and the total focal length of the lenses which function as the imaging lenses respectively have positive values.

Besides, when the meniscus lenses constituting the second lens component and the meniscus lenses constituting the fourth lens component are respectively arranged as cemented doublets, it is possible to correct chromatic abberation more favourably.

In this case, $\phi$ does not include the refractive power of the cemented surface of the cemented doublet (for example, the lens surfaces $r_4$ in embodiment 1), as evidenced from the above-mentioned definition of $\phi$.

Furthermore, the concave surfaces which face each other in the second lens component and the fourth lens component respectively have the function to correct spherical aberration etc. Besides, it is preferable to arrange that the image transmission optical system according to the present invention futher fulfills the condition shown below where reference symbols $r_a$ and $r_b$ respectively represent radii of curvature of the above-mentioned concave surfaces because it is possible to thereby correct the other aberrations favourably.

$$0.1 < |r_b/r_a| < 10$$

When the condition shown in the above is not fulfilled, the function to correct aberrations is alloted to only one of the two concave surfaces, i.e., $r_a$ or $r_b$, and, therefore, it is difficult to correct aberrations favourably.

BRIEF DESCRIPTION OF THE DRAWINGS

FIGS. 3 through 9 respectively show sectional views of Embodiments 1 through 7 of the present invention;

FIGS. 10 through 16 respectively show graphs illustrating aberration curves of Embodiments 1 through 7 of the present invention.

DETAILED DESCRIPTION OF THE PREFERRED EMBODIMENTS

Figure 1:
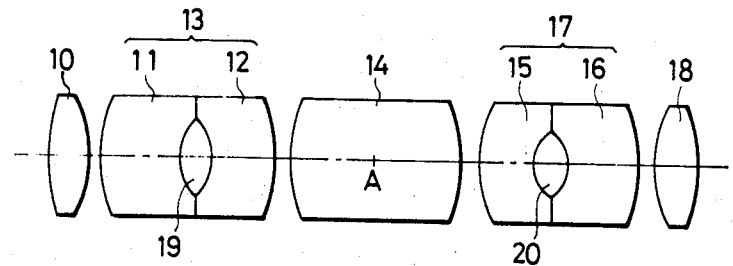
FIG. 1 shows a sectional view of the image transmission optical system according to the present invention.
Figure 2:
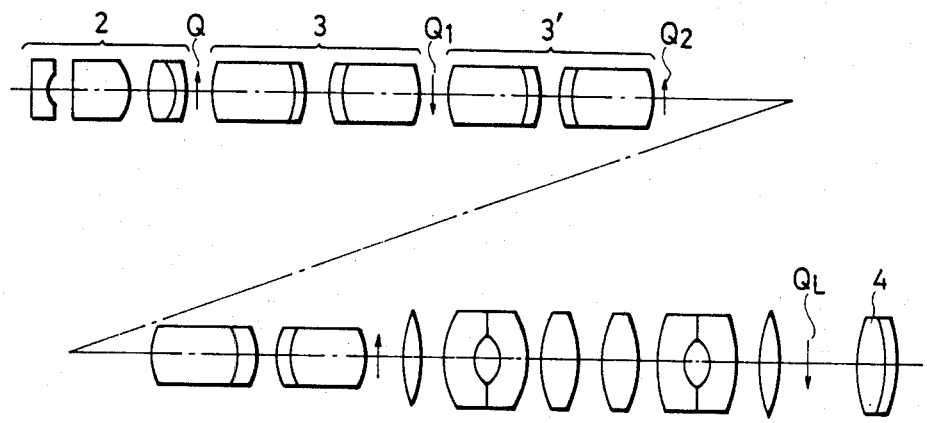
FIG. 2 shows the composition of an example of an optical system of an inflexible-type endoscope in which the image transmission optical system according to the present invention is used.
Figure 3:
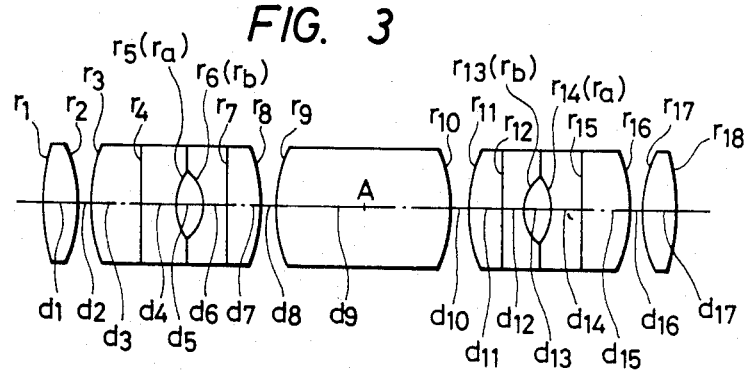
Figure 7:
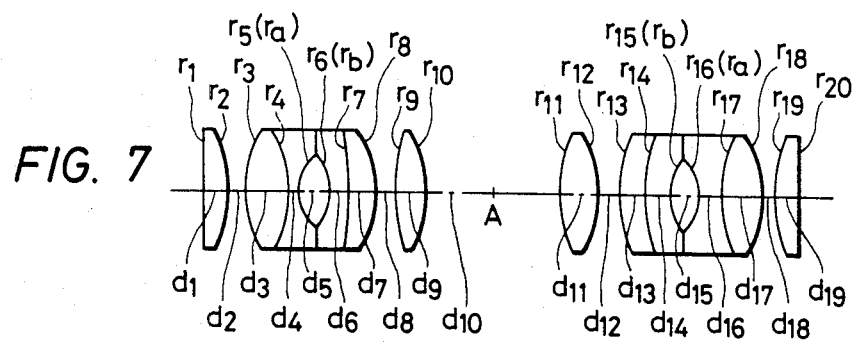
Figure 8:
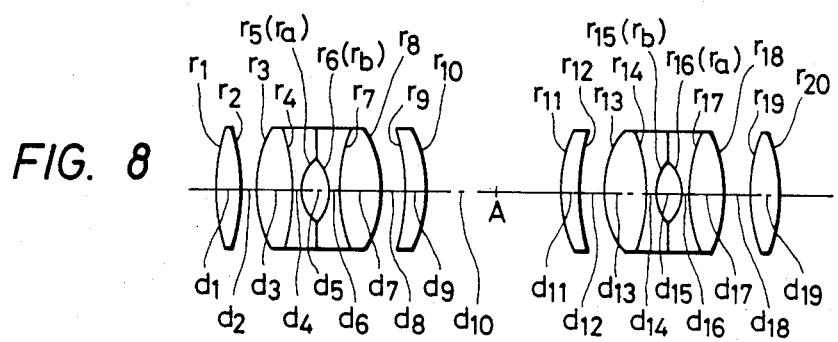
Figure 9:
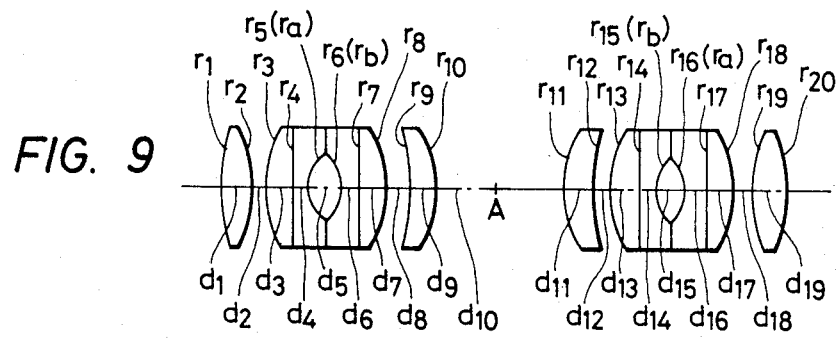

Now, preferred embodiments of the image transmission optical system for an endoscope according to the present invention are shown below.

| Embodiment 1 | | | |
|---|---|---|---|
| $r_1 = 58.646$ | | | |
| $d_1 = 2.753$ | $n_1 = 1.6968$ | | $\nu_1 = 55.52$ |
| $r_2 = -23.009$ | | | |
| $d_2 = 3.287$ | | | |
| $r_3 = 9.164$ | | | |
| $d_3 = 6.216$ | $n_2 = 1.6968$ | | $\nu_2 = 55.52$ |
| $r_4 = \infty$ | | | |
| $d_4 = 1.615$ | $n_3 = 1.71736$ | | $\nu_3 = 29.51$ |
| $r_5 = 3.524$ | | | |
| $d_5 = 4.961$ | | | |
| $r_6 = -5.899$ | | | |
| $d_6 = 1.615$ | $n_4 = 1.71736$ | | $\nu_4 = 29.51$ |
| $r_7 = \infty$ | | | |
| $d_7 = 6.222$ | $n_5 = 1.6968$ | | $\nu_5 = 55.52$ |
| $r_8 = -9.851$ | | | |
| $d_8 = 0.374$ | | | |
| $r_9 = 21.179$ | | | |
| $d_9 = 8.276$ | $n_6 = 1.6968$ | | $\nu_6 = 55.52$ |
| $r_{10} = -21.179$ | | | |
| $d_{10} = 0.374$ | | | |
| $r_{11} = 9.851$ | | | |
| $d_{11} = 6.222$ | $n_7 = 1.6968$ | | $\nu_7 = 55.52$ |
| $r_{12} = \infty$ | | | |
| $d_{12} = 1.615$ | $n_8 = 1.71736$ | | $\nu_8 = 29.51$ |
| $r_{13} = 5.899$ | | | |
| $d_{13} = 4.961$ | | | |
| $r_{14} = -3.524$ | | | |
| $d_{14} = 1.615$ | $n_9 = 1.71736$ | | $\nu_9 = 29.51$ |
| $r_{15} = \infty$ | | | |
| $d_{15} = 6.216$ | $n_{10} = 1.6968$ | | $\nu_{10} = 55.52$ |
| $r_{16} = -9.164$ | | | |
| $d_{16} = 3.287$ | | | |
| $r_{17} = 23.009$ | | | |
| $d_{17} = 2.753$ | $n_{11} = 1.6968$ | | $\nu_{11} = 55.52$ |
| $r_{18} = -58.646$ | | | |
| $f = 64.674 \quad \phi = -0.169$ | | | |
| $|r_6/r_5| = |r_{13}/r_{14}| = 1.674$ | | | |

| Embodiment 2 | | | |
|---|---|---|---|
| $r_1 = -313.315$ | | | |
| $d_1 = 0.565$ | $n_1 = 1.6968$ | | $\nu_1 = 55.52$ |
| $r_2 = -14.584$ | | | |
| $d_2 = 0.166$ | | | |
| $r_3 = 11.667$ | | | |
| $d_3 = 6.221$ | $n_2 = 1.6968$ | | $\nu_2 = 55.52$ |
| $r_4 = -12.745$ | | | |
| $d_4 = 1.866$ | $n_3 = 1.5927$ | | $\nu_3 = 35.29$ |
| $r_5 = 4.391$ | | | |
| $d_5 = 5.416$ | | | |
| $r_6 = -3.994$ | | | |
| $d_6 = 1.985$ | $n_4 = 1.78472$ | | $\nu_4 = 25.71$ |
| $r_7 = -27.7571$ | | | |
| $d_7 = 6.261$ | $n_5 = 1.6968$ | | $\nu_5 = 55.52$ |
| $r_8 = -10.3197$ | | | |
| $d_8 = 0.814$ | | | |
| $r_9 = -90.1319$ | | | |
| $d_9 = 5.284$ | $n_6 = 1.788$ | | $\nu_6 = 47.38$ |
| $r_{10} = -17.155$ | | | |
| $d_{10} = 7.845$ | | | |
| $r_{11} = 17.155$ | | | |
| $d_{11} = 5.284$ | $n_7 = 1.788$ | | $\nu_7 = 47.38$ |
| $r_{12} = 90.1319$ | | | |
| $d_{12} = 0.814$ | | | |
| $r_{13} = 10.3197$ | | | |
| $d_{13} = 6.261$ | $n_8 = 1.6968$ | | $\nu_8 = 55.52$ |
| $r_{14} = 27.7571$ | | | |
| $d_{14} = 1.985$ | $n_9 = 1.78472$ | | $\nu_9 = 25.71$ |
| $r_{15} = 3.994$ | | | |
| $d_{15} = 5.416$ | | | |
| $r_{16} = -4.391$ | | | |
| $d_{16} = 1.866$ | $n_{10} = 1.5927$ | | $\nu_{10} = 35.29$ |
| $r_{17} = 12.745$ | | | |
| $d_{17} = 6.221$ | $n_{11} = 1.6968$ | | $\nu_{11} = 55.52$ |
| $r_{18} = -11.667$ | | | |
| $d_{18} = 0.166$ | | | |
| $r_{19} = 14.584$ | | | |
| $d_{19} = 0.565$ | $n_{12} = 1.6968$ | | $\nu_{12} = 55.52$ |
| $r_{20} = 313.315$ | | | |
| $f = 45.03 \quad \phi = -0.121$ | | | |
| $|r_6/r_5| = |r_{15}/r_{16}| = 0.91$ | | | |

| Embodiment 3 | | | |
|---|---|---|---|
| $r_1 = -16.589$ | | | |
| $d_1 = 3.733$ | $n_1 = 1.6968$ | | $\nu_1 = 55.52$ |
| $r_2 = -12.559$ | | | |
| $d_2 = 5.447$ | | | |
| $r_3 = 8.100$ | | | |
| $d_3 = 5.632$ | $n_2 = 1.6968$ | | $\nu_2 = 55.52$ |
| $r_4 = \infty$ | | | |
| $d_4 = 1.864$ | $n_3 = 1.71736$ | | $\nu_3 = 29.51$ |

4,676,606

-continued

| | | |
|---|---|---|
| $r_5 = 5.4674$ | | |
| $d_5 = 9.899$ | | |
| $r_6 = -3.474$ | | |
| $d_6 = 1.864$ | $n_4 = 1.71736$ | $\nu_4 = 29.51$ |
| $r_7 = \infty$ | | |
| $d_7 = 5.632$ | $n_5 = 1.6968$ | $\nu_5 = 55.52$ |
| $r_8 = -8.100$ | | |
| $d_8 = 0.498$ | | |
| $r_9 = -238.045$ | | |
| $d_9 = 2.987$ | $n_6 = 1.6968$ | $\nu_6 = 55.52$ |
| $r_{10} = -19.919$ | | |
| $d_{10} = 7.466$ | | |
| $r_{11} = 19.919$ | | |
| $d_{11} = 2.987$ | $n_7 = 1.6968$ | $\nu_7 = 55.52$ |
| $r_{12} = 238.045$ | | |
| $d_{12} = 0.498$ | | |
| $r_{13} = 8.100$ | | |
| $d_{13} = 5.632$ | $n_8 = 1.6968$ | $\nu_8 = 55.52$ |
| $r_{14} = \infty$ | | |
| $d_{14} = 1.864$ | $n_9 = 1.71736$ | $\nu_9 = 29.51$ |
| $r_{15} = 3.474$ | | |
| $d_{15} = 9.899$ | | |
| $r_{16} = -5.4674$ | | |
| $d_{16} = 1.864$ | $n_{10} = 1.71736$ | $\nu_{10} = 29.51$ |
| $r_{17} = \infty$ | | |
| $d_{17} = 5.632$ | $n_{11} = 1.6968$ | $\nu_{11} = 55.52$ |
| $r_{18} = -8.100$ | | |
| $d_{18} = 5.447$ | | |
| $r_{19} = 12.559$ | | |
| $d_{19} = 3.733$ | $n_{12} = 1.6968$ | $\nu_{12} = 55.52$ |
| $r_{20} = 16.589$ | | |

$f = 52.254 \quad \phi = -0.119$
$|r_6/r_5| = |r_{15}/r_{16}| = 0.6354$

Embodiment 4

| | | |
|---|---|---|
| $r_1 = 31.769$ | | |
| $d_1 = 2.271$ | $n_1 = 1.6968$ | $\nu_1 = 55.52$ |
| $r_2 = -31.769$ | | |
| $d_2 = 0.786$ | | |
| $r_3 = 7.921$ | | |
| $d_3 = 5.842$ | $n_2 = 1.6968$ | $\nu_2 = 55.52$ |
| $r_4 = \infty$ | | |
| $d_4 = 1.963$ | $n_3 = 1.7400$ | $\nu_3 = 28.29$ |
| $r_5 = 3.121$ | | |
| $d_5 = 4.399$ | | |
| $r_6 = -3.121$ | | |
| $d_6 = 1.963$ | $n_4 = 1.7400$ | $\nu_4 = 28.29$ |
| $r_7 = \infty$ | | |
| $d_7 = 5.691$ | $n_5 = 1.6968$ | $\nu_5 = 55.52$ |
| $r_8 = -7.279$ | | |
| $d_8 = 1.212$ | | |
| $r_9 = \infty$ | | |
| $d_9 = 5.338$ | $n_6 = 1.6968$ | $\nu_6 = 55.52$ |
| $r_{10} = -21.910$ | | |
| $d_{10} = 6.807$ | | |
| $r_{11} = 21.910$ | | |
| $d_{11} = 5.338$ | $n_7 = 1.6968$ | $\nu_7 = 55.52$ |
| $r_{12} = \infty$ | | |
| $d_{12} = 1.212$ | | |
| $r_{13} = 7.279$ | | |
| $d_{13} = 5.691$ | $n_8 = 1.6968$ | $\nu_8 = 55.52$ |
| $r_{14} = \infty$ | | |
| $d_{14} = 1.963$ | $n_9 = 1.7400$ | $\nu_9 = 28.29$ |
| $r_{15} = 3.121$ | | |
| $d_{15} = 4.399$ | | |
| $r_{16} = -3.121$ | | |
| $d_{16} = 1.963$ | $n_{10} = 1.7400$ | $\nu_{10} = 28.29$ |
| $r_{17} = \infty$ | | |
| $d_{17} = 5.842$ | $n_{11} = 1.6968$ | $\nu_{11} = 55.52$ |
| $r_{18} = -7.921$ | | |
| $d_{18} = 0.786$ | | |
| $r_{19} = 31.769$ | | |
| $d_{19} = 2.271$ | $n_{12} = 1.6968$ | $\nu_{12} = 55.52$ |
| $r_{20} = -31.769$ | | |

$f = 50.807 \quad \phi = -0.215$
$|r_6/r_5| = |r_{15}/r_{16}| = 1.0$

Embodiment 5

| | | |
|---|---|---|
| $r_1 = \infty$ | | |
| $d_1 = 3.843$ | $n_1 = 1.6968$ | $\nu_1 = 55.52$ |
| $r_2 = -11.657$ | | |
| $d_2 = 0.511$ | | |
| $r_3 = 19.494$ | | |

-continued

| | | |
|---|---|---|
| $r_3 = 4.611$ | $n_2 = 1.6968$ | $\nu_2 = 55.52$ |
| $r_4 = -23.2315$ | | |
| $d_4 = 1.281$ | $n_3 = 1.5927$ | $\nu_3 = 35.29$ |
| $r_5 = 5.245$ | | |
| $d_5 = 7.711$ | | |
| $r_6 = -5.987$ | | |
| $d_6 = 1.383$ | $n_4 = 1.78472$ | $\nu_4 = 25.71$ |
| $r_7 = -27.5298$ | | |
| $d_7 = 4.918$ | $n_5 = 1.6968$ | $\nu_5 = 55.52$ |
| $r_8 = -10.0528$ | | |
| $d_8 = 2.586$ | | |
| $r_9 = 66.310$ | | |
| $d_9 = 3.459$ | $n_6 = 1.788$ | $\nu_6 = 47.38$ |
| $r_{10} = -33.906$ | | |
| $d_{10} = 10.256$ | | |
| $r_{11} = 33.906$ | | |
| $d_{11} = 3.459$ | $n_7 = 1.788$ | $\nu_7 = 47.38$ |
| $r_{12} = -66.310$ | | |
| $d_{12} = 2.586$ | | |
| $r_{13} = 10.0528$ | | |
| $d_{13} = 4.918$ | $n_8 = 1.6968$ | $\nu_8 = 55.52$ |
| $r_{14} = 27.5298$ | | |
| $d_{14} = 1.383$ | $n_9 = 1.78472$ | $\nu_9 = 25.71$ |
| $r_{15} = 5.987$ | | |
| $d_{15} = 7.711$ | | |
| $r_{16} = -5.245$ | | |
| $d_{16} = 1.281$ | $n_{10} = 1.5927$ | $\nu_{10} = 35.29$ |
| $r_{17} = 23.2315$ | | |
| $d_{17} = 4.611$ | $n_{11} = 1.6968$ | $\nu_{11} = 55.52$ |
| $r_{18} = -19.494$ | | |
| $d_{18} = 0.511$ | | |
| $r_{19} = 11.657$ | | |
| $d_{19} = 3.843$ | $n_{12} = 1.6968$ | $\nu_{12} = 55.52$ |
| $r_{20} = \infty$ | | |

$f = 38.618 \quad \phi = -0.044$
$|r_6/r_5| = |r_{15}/r_{16}| = 1.141$

Embodiment 6

| | | |
|---|---|---|
| $r_1 = 279.608$ | | |
| $d_1 = 5.017$ | $n_1 = 1.6968$ | $\nu_1 = 55.52$ |
| $r_2 = -31.850$ | | |
| $d_2 = 1.108$ | | |
| $r_3 = 8.248$ | | |
| $d_3 = 5.954$ | $n_2 = 1.6968$ | $\nu_2 = 55.52$ |
| $r_4 = -42.739$ | | |
| $d_4 = 1.654$ | $n_3 = 1.5927$ | $\nu_3 = 35.29$ |
| $r_5 = 4.042$ | | |
| $d_5 = 6.982$ | | |
| $r_6 = -4.001$ | | |
| $d_6 = 1.786$ | $n_4 = 1.78472$ | $\nu_4 = 25.71$ |
| $r_7 = 67.283$ | | |
| $d_7 = 6.3513$ | $n_5 = 1.6968$ | $\nu_5 = 55.52$ |
| $r_8 = -8.302$ | | |
| $d_8 = 3.407$ | | |
| $r_9 = -308.943$ | | |
| $d_9 = 4.477$ | $n_6 = 1.788$ | $\nu_6 = 47.38$ |
| $r_{10} = -25.8713$ | | |
| $d_{10} = 6.643$ | | |
| $r_{11} = 25.8713$ | | |
| $d_{11} = 4.477$ | $n_7 = 1.788$ | $\nu_7 = 47.38$ |
| $r_{12} = 308.943$ | | |
| $d_{12} = 3.407$ | | |
| $r_{13} = 8.302$ | | |
| $d_{13} = 6.3513$ | $n_8 = 1.6968$ | $\nu_8 = 55.52$ |
| $r_{14} = -67.283$ | | |
| $d_{14} = 1.786$ | $n_9 = 1.78472$ | $\nu_9 = 25.71$ |
| $r_{15} = 4.001$ | | |
| $d_{15} = 6.982$ | | |
| $r_{16} = -4.042$ | | |
| $d_{16} = 1.654$ | $n_{10} = 1.5927$ | $\nu_{10} = 35.29$ |
| $r_{17} = 42.739$ | | |
| $d_{17} = 5.954$ | $n_{11} = 1.6968$ | $\nu_{11} = 55.52$ |
| $r_{18} = -8.248$ | | |
| $d_{18} = 1.108$ | | |
| $r_{19} = 31.850$ | | |
| $d_{19} = 5.017$ | $n_{12} = 1.6968$ | $\nu_{12} = 55.52$ |
| $r_{20} = -279.608$ | | |

$f = 52.361 \quad \phi = -0.122$
$|r_6/r_5| = |r_{15}/r_{16}| = 0.99$

Embodiment 7

| | | |
|---|---|---|
| $r_1 = 23.703$ | | |
| $d_1 = 1.671$ | $n_1 = 1.6968$ | $\nu_1 = 55.52$ |

-continued

| | | |
|---|---|---|
| $r_2 = -35.209$ | | |
| $d_2 = 0.125$ | | |
| $r_3 = 6.018$ | | |
| $d_3 = 4.825$ | $n_2 = 1.6968$ | $\nu_2 = 55.52$ |
| $r_4 = \infty$ | | |
| $d_4 = 1.532$ | $n_3 = 1.7400$ | $\nu_3 = 28.29$ |
| $r_5 = 2.467$ | | |
| $d_5 = 4.023$ | | |
| $r_6 = -2.467$ | | |
| $d_6 = 1.532$ | $n_4 = 1.7400$ | $\nu_4 = 28.29$ |
| $r_7 = \infty$ | | |
| $d_7 = 4.825$ | $n_5 = 1.6968$ | $\nu_5 = 55.52$ |
| $r_8 = -6.018$ | | |
| $d_8 = 0.686$ | | |
| $r_9 = -23.448$ | | |
| $d_9 = 4.101$ | $n_6 = 1.788$ | $\nu_6 = 47.38$ |
| $r_{10} = -12.841$ | | |
| $d_{10} = 5.186$ | | |
| $r_{11} = 12.841$ | | |
| $d_{11} = 4.101$ | $n_7 = 1.788$ | $\nu_7 = 47.38$ |
| $r_{12} = 23.448$ | | |
| $d_{12} = 0.686$ | | |
| $r_{13} = 6.018$ | | |
| $d_{13} = 4.825$ | $n_8 = 1.6968$ | $\nu_8 = 55.52$ |
| $r_{14} = \infty$ | | |
| $d_{14} = 1.532$ | $n_9 = 1.7400$ | $\nu_9 = 28.29$ |
| $r_{15} = 2.467$ | | |
| $d_{15} = 4.023$ | | |
| $r_{16} = -2.467$ | | |
| $d_{16} = 1.532$ | $n_{10} = 1.7400$ | $\nu_{10} = 28.29$ |
| $r_{17} = \infty$ | | |
| $d_{17} = 4.825$ | $n_{11} = 1.6968$ | $\nu_{11} = 55.52$ |
| $r_{18} = -6.018$ | | |
| $d_{18} = 0.125$ | | |
| $r_{19} = 35.209$ | | |
| $d_{19} = 1.671$ | $n_{12} = 1.6968$ | $\nu_{12} = 55.52$ |
| $r_{20} = -23.703$ | | |
| $f = 46.352 \quad \phi = -0.291$ | | |
| $|r_6/r_5| = |r_{15}/r_{16}| = 1.0$ | | |

In respective embodiments shown in the above, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, reference symbols $\nu_1, \nu_2, \ldots$ respectively represent Abbe's numbers of respective lenses, reference symbol f represents the total focal length of lenses arranged on one side of the center A of the third lens component, and reference symbol $\phi$ represents the sum of refractive powers of lens surfaces located on one side of the center A of the third lens component except the cemented surfaces.

The numerical data of respective embodiments shown in the above are given on the following bases, i.e., the image transmission distance per image transmission optical system is 100 mm.

Out of said embodiments, Embodiment 1 is arranged that the third lens component consists of one lens element and the other embodiments are arranged that the third lens component consists of two lens elements which are spaced from each other.

Figure 12:
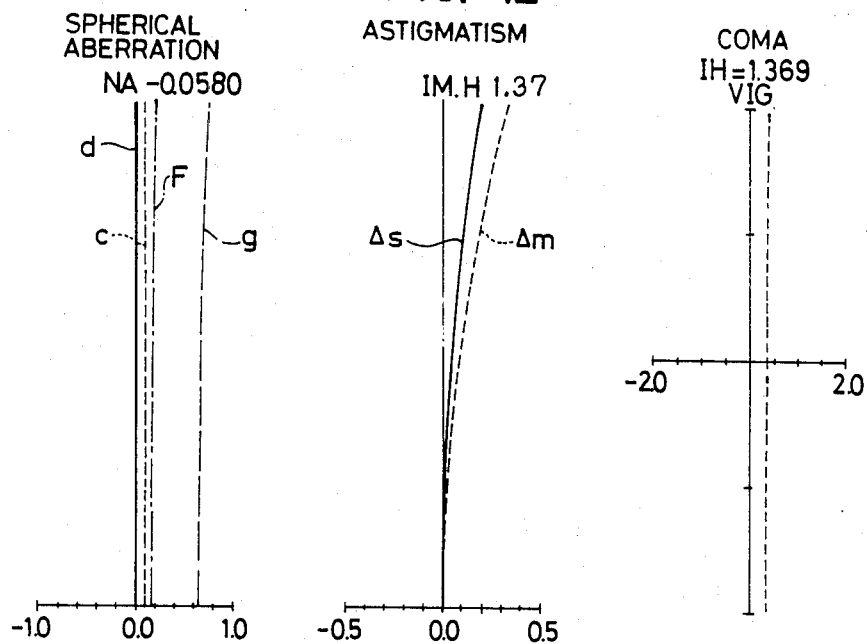
Figure 13:
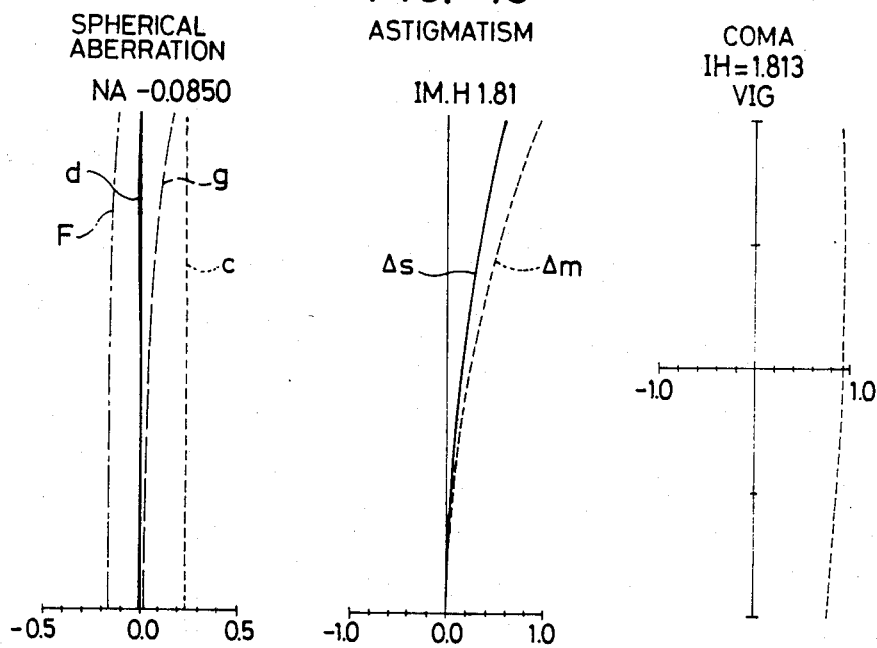
Figure 17:
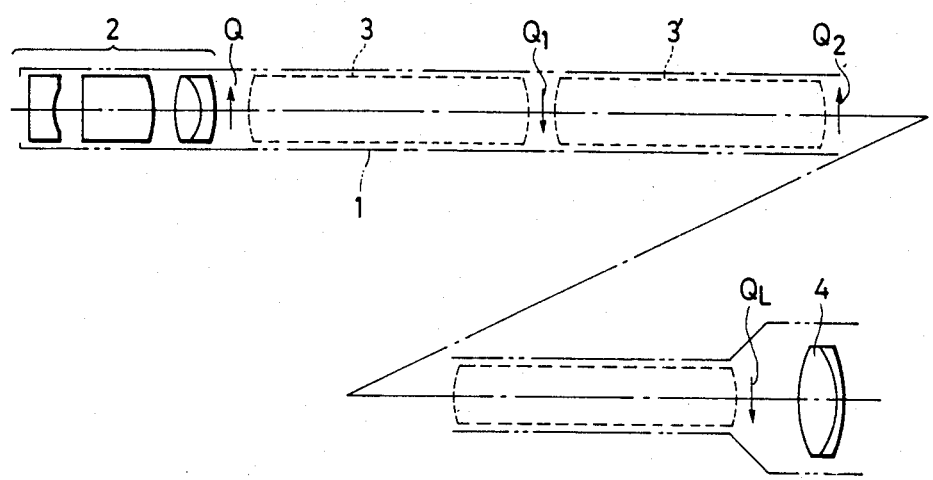
FIGS. 17 through 19 respectively show explanatory figures illustrating known image transmission optical systems.
Figure 18:
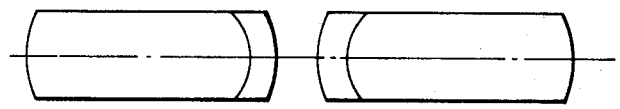
Figure 19:
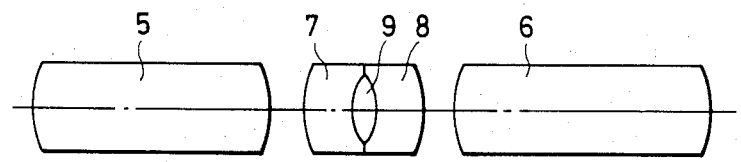

Aberration curves of said Embodiments 1 through 7 are shown in FIGS. 10 through 16 respectively. As it is evident from said aberration curves, the image surface is inclined toward the positive side, and this means that the image transmission optical system according to the present invention has strong action to correct curvature of field.

When it is necessary to cause still larger positive curvatures of field, the image transmission optical system according to the present invention may be used in a plural number.

As described so far, the image transmission optical system according to the present invention has strong action to correct curvature of field and, when it is used in an inflexible-type endoscope or the like, it serves to make the flatness of image of the endoscope optical system as a whole favourable.

I claim:

1. An image transmission optical system for an endoscope comprising a first lens component comprising a positive lens, a second lens component comprising two meniscus lenses arranged that the concave surfaces thereof face each other, a third lens component having positive refractive power, a fourth lens component comprising two meniscus lenses arranged that the concave surfaces thereof face each other, and a fifth lens component comprising a positive lens, said image transmission optical system being arranged to be symmetrical in respect to the center of said third lens component.

2. An image transmission optical system for an endoscope according to claim 1 fulfilling the following condition:

$$\phi < 0$$

where, reference symbol $\phi$ represents the sum of refractive powers of lens surfaces located on one side of the center of said third lens component and where said lens surfaces have spaces therebetween.

3. An image transmission optical system for an endoscope according to claim 2 further fulfilling the following condition where radii of curvature of concave surfaces of said meniscus lenses arranged on the entrance side and exit side in said second lens component are respectively represented by reference symbols $r_a$ and $r_b$, and radii of curvature of concave surfaces of said meniscus lenses arranged on the entrance side and exit side in said fourth lens component are respectively represented by reference symbols $r_b$ and $r_a$, $$0.1 < |/r_a r_b| < 10.$$

4. An image transmission optical system for an endoscope according to claim 3 having the following numerical data:

| | | |
|---|---|---|
| $r_1 = 58.646$ | | |
| $d_1 = 2.753$ | $n_1 = 1.6968$ | $\nu_1 = 55.52$ |
| $r_2 = -23.009$ | | |
| $d_2 = 3.287$ | | |
| $r_3 = 9.164$ | | |
| $d_3 = 6.216$ | $n_2 = 1.6968$ | $\nu_2 = 55.52$ |
| $r_4 = \infty$ | | |
| $d_4 = 1.615$ | $n_3 = 1.71736$ | $\nu_3 = 29.51$ |
| $r_5 = 3.524$ | | |
| $d_5 = 4.961$ | | |
| $r_6 = -5.899$ | | |
| $d_6 = 1.615$ | $n_4 = 1.71736$ | $\nu_4 = 29.51$ |
| $r_7 = \infty$ | | |
| $d_7 = 6.222$ | $n_5 = 1.6968$ | $\nu_5 = 55.52$ |
| $r_8 = -9.851$ | | |
| $d_8 = 0.374$ | | |
| $r_9 = 21.179$ | | |
| $d_9 = 8.276$ | $n_6 = 1.6968$ | $\nu_6 = 55.52$ |
| $r_{10} = -21.179$ | | |
| $d_{10} = 0.374$ | | |
| $r_{11} = 9.851$ | | |
| $d_{11} = 6.222$ | $n_7 = 1.6968$ | $\nu_7 = 55.52$ |
| $r_{12} = \infty$ | | |
| $d_{12} = 1.615$ | $n_8 = 1.71736$ | $\nu_8 = 29.51$ |
| $r_{13} = 5.899$ | | |

-continued

| | | |
|---|---|---|
| $d_{13} = 4.961$ | | |
| $r_{14} = -3.524$ | | |
| $d_{14} = 1.615$ | $n_9 = 1.71736$ | $\nu_9 = 29.51$ |
| $r_{15} = \infty$ | | |
| $d_{15} = 6.216$ | $n_{10} = 1.6968$ | $\nu_{10} = 55.52$ |
| $r_{16} = -9.164$ | | |
| $d_{16} = 3.287$ | | |
| $r_{17} = 23.009$ | | |
| $d_{17} = 2.753$ | $n_{11} = 1.6968$ | $\nu_{11} = 55.52$ |
| $r_{18} = -58.646$ | | |
| $f = 64.674 \quad \phi = -0.169$ | | |
| $|r_6/r_5| = |r_{13}/r_{14}| = 1.67$ | | | where, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, reference symbols $\nu_1, \nu_2, \ldots$ respectively represent Abbe's numbers of respective lenses, reference symbol f represents the total focal length of lenses arranged on one side of the center of said third lens component, and reference symbol $\phi$ represents the sum of refractive powers of lens surfaces located on one side of the center of said third lens component (except the cemented surfaces).

5. An image transmission optical system for an endoscope according to claim 3 having the following numerical data:

| | | |
|---|---|---|
| $r_1 = -313.315$ | | |
| $d_1 = 0.565$ | $n_1 = 1.6968$ | $\nu_1 = 55.52$ |
| $r_2 = -14.584$ | | |
| $d_2 = 0.166$ | | |
| $r_3 = 11.667$ | | |
| $d_3 = 6.221$ | $n_2 = 1.6968$ | $\nu_2 = 55.52$ |
| $r_4 = -12.745$ | | |
| $d_4 = 1.866$ | $n_3 = 1.5927$ | $\nu_3 = 35.29$ |
| $r_5 = 4.391$ | | |
| $d_5 = 5.416$ | | |
| $r_6 = -3.994$ | | |
| $d_6 = 1.985$ | $n_4 = 1.79472$ | $\nu_4 = 25.71$ |
| $r_7 = -27.7571$ | | |
| $d_7 = 6.261$ | $n_5 = 1.6968$ | $\nu_5 = 55.52$ |
| $r_8 = -10.3197$ | | |
| $d_8 = 0.814$ | | |
| $r_9 = -90.1319$ | | |
| $d_9 = 5.284$ | $n_6 = 1.788$ | $\nu_6 = 47.38$ |
| $r_{10} = -17.155$ | | |
| $d_{10} = 7.845$ | | |
| $r_{11} = 17.155$ | | |
| $d_{11} = 5.284$ | $n_7 = 1.788$ | $\nu_7 = 47.38$ |
| $r_{12} = 90.1319$ | | |
| $d_{12} = 0.814$ | | |
| $r_{13} = 10.3197$ | | |
| $d_{13} = 6.261$ | $n_8 = 1.6968$ | $\nu_8 = 55.52$ |
| $r_{14} = 27.7571$ | | |
| $d_{14} = 1.985$ | $n_9 = 1.78472$ | $\nu_9 = 25.71$ |
| $r_{15} = 3.994$ | | |
| $d_{15} = 5.416$ | | |
| $r_{16} = -4.391$ | | |
| $d_{16} = 1.866$ | $n_{10} = 1.5927$ | $\nu_{10} = 35.29$ |
| $r_{17} = 12.745$ | | |
| $d_{17} = 6.221$ | $n_{11} = 1.6968$ | $\nu_{11} = 55.52$ |
| $r_{18} = -11.667$ | | |
| $d_{18} = 0.166$ | | |
| $r_{19} = 14.584$ | | |
| $d_{19} = 0.565$ | $n_{12} = 1.6968$ | $\nu_{12} = 55.52$ |
| $r_{20} = 313.315$ | | |
| $f = 45.03 \quad \phi = -0.121$ | | |
| $|r_6/r_5| = |r_{15}/r_{16}| = 0.91$ | | | where, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, reference symbols $\nu_1, \nu_2, \ldots$ respectively represent Abbe's numbers of respective lenses, reference symbol f represents the total focal length of lenses arranged on one side of the center of said third lens component, and reference symbol $\phi$ represents the sum of refractive powers of lens surfaces located on one side of the center of said third lens component (except the cemented surfaces).

6. An image transmission optical system for an endoscope according to claim 3 having the following numerical data:

| | | |
|---|---|---|
| $r_1 = -16.589$ | | |
| $d_1 = 3.733$ | $n_1 = 1.6968$ | $\nu_1 = 55.52$ |
| $r_2 = -12.559$ | | |
| $d_2 = 5.447$ | | |
| $r_3 = 8.100$ | | |
| $d_3 = 5.632$ | $n_2 = 1.6968$ | $\nu_2 = 55.52$ |
| $r_4 = \infty$ | | |
| $d_4 = 1.864$ | $n_3 = 1.71736$ | $\nu_3 = 29.51$ |
| $r_5 = 5.4674$ | | |
| $d_5 = 9.899$ | | |
| $r_6 = -3.474$ | | |
| $d_6 = 1.864$ | $n_4 = 1.71736$ | $\nu_4 = 29.51$ |
| $r_7 = \infty$ | | |
| $d_7 = 5.632$ | $n_5 = 1.6968$ | $\nu_5 = 55.52$ |
| $r_8 = -8.100$ | | |
| $d_8 = 0.498$ | | |
| $r_9 = -238.045$ | | |
| $d_9 = 2.987$ | $n_6 = 1.6968$ | $\nu_6 = 55.52$ |
| $r_{10} = -19.919$ | | |
| $d_{10} = 7.466$ | | |
| $r_{11} = 19.919$ | | |
| $d_{11} = 2.987$ | $n_7 = 1.6968$ | $\nu_7 = 55.52$ |
| $r_{12} = 238.045$ | | |
| $d_{12} = 0.498$ | | |
| $r_{13} = 8.100$ | | |
| $d_{13} = 5.632$ | $n_8 = 1.6968$ | $\nu_8 = 55.52$ |
| $r_{14} = \infty$ | | |
| $d_{14} = 1.864$ | $n_9 = 1.71736$ | $\nu_9 = 29.51$ |
| $r_{15} = 3.474$ | | |
| $d_{15} = 9.899$ | | |
| $r_{16} = -5.4674$ | | |
| $d_{16} = 1.864$ | $n_{10} = 1.71736$ | $\nu_{10} = 29.51$ |
| $r_{17} = \infty$ | | |
| $d_{17} = 5.632$ | $n_{11} = 1.6968$ | $\nu_{11} = 55.52$ |
| $r_{18} = -8.100$ | | |
| $d_{18} = 5.447$ | | |
| $r_{19} = 12.559$ | | |
| $d_{19} = 3.733$ | $n_{12} = 1.6968$ | $\nu_{12} = 55.52$ |
| $r_{20} = 16.589$ | | |
| $f = 52.254 \quad \phi = -0.119$ | | |
| $|r_6/r_5| = |r_{15}/r_{16}| = 0.6354$ | | | where, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, reference symbols $\nu_1, \nu_2, \ldots$ respectively represent Abbe's numbers of respective lenses, reference symbol f represents the total focal length of lenses arranged on one side of the center of said third lens component, and reference symbol $\phi$ represents the sum of refractive powers of lens surfaces located on one side of the center of said third lens component (except the cemented surfaces).

7. An image transmission optical system for an endoscope according to claim 3 having the following numerical data:

| | | |
|---|---|---|
| $r_1 = 31.769$ | | |
| $d_1 = 2.271$ | $n_1 = 1.6968$ | $\nu_1 = 55.52$ |
| $r_2 = -31.769$ | | |
| $d_2 = 0.786$ | | |
| $r_3 = 7.921$ | | |
| $d_3 = 5.842$ | $n_2 = 1.6968$ | $\nu_2 = 55.52$ |
| $r_4 = \infty$ | | |
| $d_4 = 1.963$ | $n_3 = 1.7400$ | $\nu_3 = 28.29$ |
| $r_5 = 3.121$ | | |
| $d_5 = 4.399$ | | |
| $r_6 = -3.121$ | | |
| $d_6 = 1.963$ | $n_4 = 1.7400$ | $\nu_4 = 28.29$ |
| $r_7 = \infty$ | | |
| $d_7 = 5.691$ | $n_5 = 1.6968$ | $\nu_5 = 55.52$ |
| $r_8 = -7.279$ | | |
| $d_8 = 1.212$ | | |
| $r_9 = \infty$ | | |
| $d_9 = 5.338$ | $n_6 = 1.6968$ | $\nu_6 = 55.52$ |
| $r_{10} = -21.910$ | | |
| $d_{10} = 6.807$ | | |
| $r_{11} = 21.910$ | | |
| $d_{11} = 5.338$ | $n_7 = 1.6968$ | $\nu_7 = 55.52$ |
| $r_{12} = \infty$ | | |
| $d_{12} = 1.212$ | | |
| $r_{13} = 7.279$ | | |
| $d_{13} = 5.691$ | $n_8 = 1.6968$ | $\nu_8 = 55.52$ |
| $r_{14} = \infty$ | | |
| $d_{14} = 1.963$ | $n_9 = 1.7400$ | $\nu_9 = 28.29$ |
| $r_{15} = 3.121$ | | |
| $d_{15} = 4.399$ | | |
| $r_{16} = -3.121$ | | |
| $d_{16} = 1.963$ | $n_{10} = 1.7400$ | $\nu_{10} = 28.29$ |
| $r_{17} = \infty$ | | |
| $d_{17} = 5.842$ | $n_{11} = 1.6968$ | $\nu_{11} = 55.52$ |
| $r_{18} = -7.921$ | | |
| $d_{18} = 0.786$ | | |
| $r_{19} = 31.769$ | | |
| $d_{19} = 2.271$ | $n_{12} = 1.6968$ | $\nu_{12} = 55.52$ |
| $r_{20} = -31.769$ | | |
| $f = 50.589 \quad \phi = -0.215$ | | |
| $|r_6/r_5| = |r_{15}/r_{16}| = 1.0$ | | | where, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, reference symbols $\nu_1, \nu_2, \ldots$ respectively represent Abbe's numbers of respective lenses, reference symbol f represents the total focal length of lenses arranged on lens side of the center of said third lens component, and reference symbol $\phi$ represents the sum of refractive powers of lens surfaces located on one side of the center of said third lens component (except the cemented surfaces).

8. An image transmission optical system for an endoscope according to claim 3 having the following numerical data:

| | | |
|---|---|---|
| $r_1 = \infty$ | | |
| $d_1 = 3.843$ | $n_1 = 1.6968$ | $\nu_1 = 55.52$ |
| $r_2 = -11.657$ | | |
| $d_2 = 0.511$ | | |
| $r_3 = 19.494$ | | |
| $d_3 = 4.611$ | $n_2 = 1.6968$ | $\nu_2 = 55.52$ |
| $r_4 = -23.2315$ | | |
| $d_4 = 1.281$ | $n_3 = 1.5927$ | $\nu_3 = 35.29$ |
| $r_5 = 5.245$ | | |
| $d_5 = 7.711$ | | |
| $r_6 = -5.987$ | | |
| $d_6 = 1.383$ | $n_4 = 1.78472$ | $\nu_4 = 25.71$ |
| $r_7 = -27.5298$ | | |
| $d_7 = 4.918$ | $n_5 = 1.6968$ | $\nu_5 = 55.52$ |
| $r_8 = -10.0528$ | | |
| $d_8 = 2.586$ | | |
| $r_9 = 66.310$ | | |
| $d_9 = 3.459$ | $n_6 = 1.788$ | $\nu_6 = 47.38$ |
| $r_{10} = -33.906$ | | |
| $d_{10} = 10.256$ | | |
| $r_{11} = 33.906$ | | |
| $d_{11} = 3.459$ | $n_7 = 1.788$ | $\nu_7 = 47.38$ |
| $r_{12} = -66.310$ | | |
| $d_{12} = 2.586$ | | |
| $r_{13} = 10.0528$ | | |
| $d_{13} = 4.918$ | $n_8 = 1.6968$ | $\nu_8 = 55.52$ |
| $r_{14} = 27.5298$ | | |
| $d_{14} = 1.383$ | $n_9 = 1.78472$ | $\nu_9 = 25.71$ |
| $r_{15} = 5.987$ | | |
| $d_{15} = 7.711$ | | |
| $r_{16} = -5.245$ | | |
| $d_{16} = 1.281$ | $n_{10} = 1.5927$ | $\nu_{10} = 35.29$ |
| $r_{17} = 23.2315$ | | |
| $d_{17} = 4.611$ | $n_{11} = 1.6968$ | $\nu_{11} = 55.52$ |
| $r_{18} = -19.494$ | | |
| $d_{18} = 0.511$ | | |
| $r_{19} = 11.657$ | | |
| $d_{19} = 3.843$ | $n_{12} = 1.6968$ | $\nu_{12} = 55.52$ |
| $r_{20} = \infty$ | | |
| $f = 38.618 \quad \phi = -0.044$ | | |
| $|r_6/r_5| = |r_{15}/r_{16}| = 1.141$ | | | where, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, reference symbols $\nu_1, \nu_2, \ldots$ respectively represent Abbe's numbers of respective lenses, reference symbol f represents the total focal length of lenses arranged on one side of the center of said third lens component, and reference symbol $\phi$ represents the sum of refractive powers of lens surfaces located on one side of the center of said third lens component (except the cemented surfaces).

9. An image transmission optical system for an endoscope according to claim 3 having the following numerical data:

| | | |
|---|---|---|
| $r_1 = 279.608$ | | |
| $d_1 = 5.017$ | $n_1 = 1.6968$ | $\nu_1 = 55.52$ |
| $r_2 = -31.850$ | | |
| $d_2 = 1.108$ | | |
| $r_3 = 8.248$ | | |
| $d_3 = 5.954$ | $n_2 = 1.6968$ | $\nu_2 = 55.52$ |
| $r_4 = -42.739$ | | |
| $d_4 = 1.654$ | $n_3 = 1.5927$ | $\nu_3 = 35.29$ |
| $r_5 = 4.042$ | | |
| $d_5 = 6.982$ | | |
| $r_6 = -4.001$ | | |
| $d_6 = 1.786$ | $n_4 = 1.78472$ | $\nu_4 = 25.71$ |
| $r_7 = 67.283$ | | |
| $d_7 = 6.3513$ | $n_5 = 1.6968$ | $\nu_5 = 55.52$ |
| $r_8 = -8.302$ | | |
| $d_8 = 3.407$ | | |
| $r_9 = -308.943$ | | |
| $d_9 = 4.477$ | $n_6 = 1.788$ | $\nu_6 = 47.38$ |
| $r_{10} = -25.8713$ | | |
| $d_{10} = 6.643$ | | |
| $r_{11} = 25.8713$ | | |
| $d_{11} = 4.477$ | $n_7 = 1.788$ | $\nu_7 = 47.38$ |
| $r_{12} = 308.943$ | | |
| $d_{12} = 3.407$ | | |
| $r_{13} = 8.302$ | | |
| $d_{13} = 6.3513$ | $n_8 = 1.6968$ | $\nu_8 = 55.52$ |
| $r_{14} = -67.283$ | | |
| $d_{14} = 1.786$ | $n_9 = 1.78472$ | $\nu_9 = 25.71$ |
| $r_{15} = 4.001$ | | |
| $d_{15} = 6.982$ | | |
| $r_{16} = -4.042$ | | |
| $d_{16} = 1.654$ | $n_{10} = 1.5927$ | $\nu_{10} = 35.29$ |

-continued

| | | |
|---|---|---|
| $r_{17} = 42.739$ | | |
| $d_{17} = 5.954$ | $n_{11} = 1.6968$ | $\nu_{11} = 55.52$ |
| $r_{18} = -8.248$ | | |
| $d_{18} = 1.108$ | | |
| $r_{19} = 31.850$ | | |
| $d_{19} = 5.017$ | $n_{12} = 1.6968$ | $\nu_{12} = 55.52$ |
| $r_{20} = -279.608$ | | |
| $f = 52.361 \quad \phi = -0.122$ | | |
| $|r_6/r_5| = |r_{15}/r_{16}| = 0.99$ | | | where, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, reference symbols $\nu_1, \nu_2, \ldots$ respectively represent Abbe's numbers of respective lenses, reference symbol f represents the total focal length of lenses arrnaged on one side of the center of said third lens component, and reference symbol $\phi$ represents the sum of refractive powers of lens surfaces located on one side of the center of said third lens component (except the cemented surfaces).

10. An image transmission optical system for an endoscope according to claim 3 having the following numerical data:

| | | |
|---|---|---|
| $r_1 = 23.703$ | | |
| $d_1 = 1.671$ | $n_1 = 1.6968$ | $\nu_1 = 55.52$ |
| $r_2 = -35.209$ | | |
| $d_2 = 0.125$ | | |
| $r_3 = 6.018$ | | |
| $d_3 = 4.825$ | $n_2 = 1.6968$ | $\nu_2 = 55.52$ |
| $r_4 = \infty$ | | |
| $d_4 = 1.532$ | $n_3 = 1.7400$ | $\nu_3 = 28.29$ |
| $r_5 = 2.467$ | | |
| $d_5 = 4.023$ | | |
| $r_6 = -2.467$ | | |
| $d_6 = 1.532$ | $n_4 = 1.7400$ | $\nu_4 = 28.29$ |

-continued

| | | |
|---|---|---|
| $r_7 = \infty$ | | |
| $d_7 = 4.825$ | $n_5 = 1.6968$ | $\nu_5 = 55.52$ |
| $r_8 = -6.018$ | | |
| $d_8 = 0.686$ | | |
| $r_9 = 23.448$ | | |
| $d_9 = 4.101$ | $n_6 = 1.788$ | $\nu_6 = 47.38$ |
| $r_{10} = -12.841$ | | |
| $d_{10} = 5.186$ | | |
| $r_{11} = 12.841$ | | |
| $d_{11} = 4.101$ | $n_7 = 1.788$ | $\nu_7 = 47.38$ |
| $r_{12} = 23.448$ | | |
| $d_{12} = 0.686$ | | |
| $r_{13} = 6.018$ | | |
| $d_{13} = 4.825$ | $n_8 = 1.6968$ | $\nu_8 = 55.52$ |
| $r_{14} = \infty$ | | |
| $d_{14} = 1.532$ | $n_9 = 1.7400$ | $\nu_9 = 28.29$ |
| $r_{15} = 2.467$ | | |
| $d_{15} = 4.023$ | | |
| $r_{16} = -2.467$ | | |
| $d_{16} = 1.532$ | $n_{10} = 1.7400$ | $\nu_{10} = 28.29$ |
| $r_{17} = \infty$ | | |
| $d_{17} = 4.825$ | $n_{11} = 1.6968$ | $\nu_{11} = 55.52$ |
| $r_{18} = -6.018$ | | |
| $d_{18} = 0.125$ | | |
| $r_{19} = 35.209$ | | |
| $d_{19} = 1.671$ | $n_{12} = 1.6968$ | $\nu_{12} = 55.52$ |
| $r_{20} = -23.703$ | | |
| $f = 46.352 \quad \phi = -0.291$ | | |
| $|r_6/r_5| = |r_{15}/r_{16}| = 1.0$ | | | where, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, reference symbols $\nu_1, \nu_2, \ldots$ respectively represent Abbe's numbers of respective lenses, reference symbol f represents the total focal length of lenses arranged on one side of the center of said third lens component, and reference symbol $\phi$ represents the sum of refractive powers of lens surfaces located on one side of the center of said third lens component (except the cemented surfaces).

* * * * *